United States Patent
Cummins et al.

[11] Patent Number: 6,123,537
[45] Date of Patent: Sep. 26, 2000

[54] ROUNDER BAR FOR PROCESSING BAKERY DOUGH

[75] Inventors: Chris M. Cummins, Mechanicsville; Sam Seiling, Richmond, both of Va.

[73] Assignee: Cummins Eagle, Inc., Ashland, Va.

[21] Appl. No.: 09/009,719

[22] Filed: Jan. 20, 1998

[51] Int. Cl.[7] .............................. A21C 11/00; A21C 3/02
[52] U.S. Cl. ..................... 425/332; 425/333; 426/469; 426/512; 249/115
[58] Field of Search ..................... 249/115; 425/332, 425/333; 426/496, 512

[56] References Cited

U.S. PATENT DOCUMENTS

| | | | |
|---|---|---|---|
| 793,155 | 6/1905 | Piper | 425/332 |
| 1,103,281 | 7/1914 | Frischmann | 425/333 |
| 1,152,348 | 8/1915 | Streich | 425/332 |
| 2,165,495 | 7/1939 | Marasso | 425/332 |
| 3,168,056 | 2/1965 | Engels | 425/332 |
| 3,279,936 | 10/1966 | Forestek | 425/332 |
| 3,988,144 | 10/1976 | Gorin et al. | 425/332 |
| 4,008,025 | 2/1977 | Campbell | 425/332 |
| 4,025,273 | 5/1977 | Mauer et al. | 425/332 |
| 4,110,482 | 8/1978 | Sato | 425/364 R |
| 4,124,305 | 11/1978 | Benier | 425/332 |
| 4,306,850 | 12/1981 | Cummins | 425/332 |
| 5,264,232 | 11/1993 | Campbell | 426/503 |
| 5,270,070 | 12/1993 | Campbell | 426/503 |
| 5,605,708 | 2/1997 | Cummins et al. | 425/332 |
| 5,714,178 | 2/1998 | Keener | 425/333 |
| 5,750,169 | 5/1998 | Rose et al. | 426/231 |
| 5,786,016 | 7/1998 | Campbell et al. | 425/332 |

FOREIGN PATENT DOCUMENTS

| | | | |
|---|---|---|---|
| 1098881 | 2/1957 | Germany | 425/364 |
| 291692 | 6/1928 | United Kingdom | 425/364 |
| WO 93/13667 | 7/1993 | WIPO | 425/322 |

*Primary Examiner*—Harold Pyon
*Assistant Examiner*—Thukhanh T. Nguyen
*Attorney, Agent, or Firm*—Norman B. Rainer

[57] ABSTRACT

A rounder bar for shaping pieces of baking dough advancing upon a conveyor belt has an elongated configuration having top and rear surfaces and an arcuate dough-contacting surface of convex contour with respect to the top and rear surfaces. The dough-contacting surface is provided with a non-occluding texture which minimizes adherence of the dough.

15 Claims, 2 Drawing Sheets

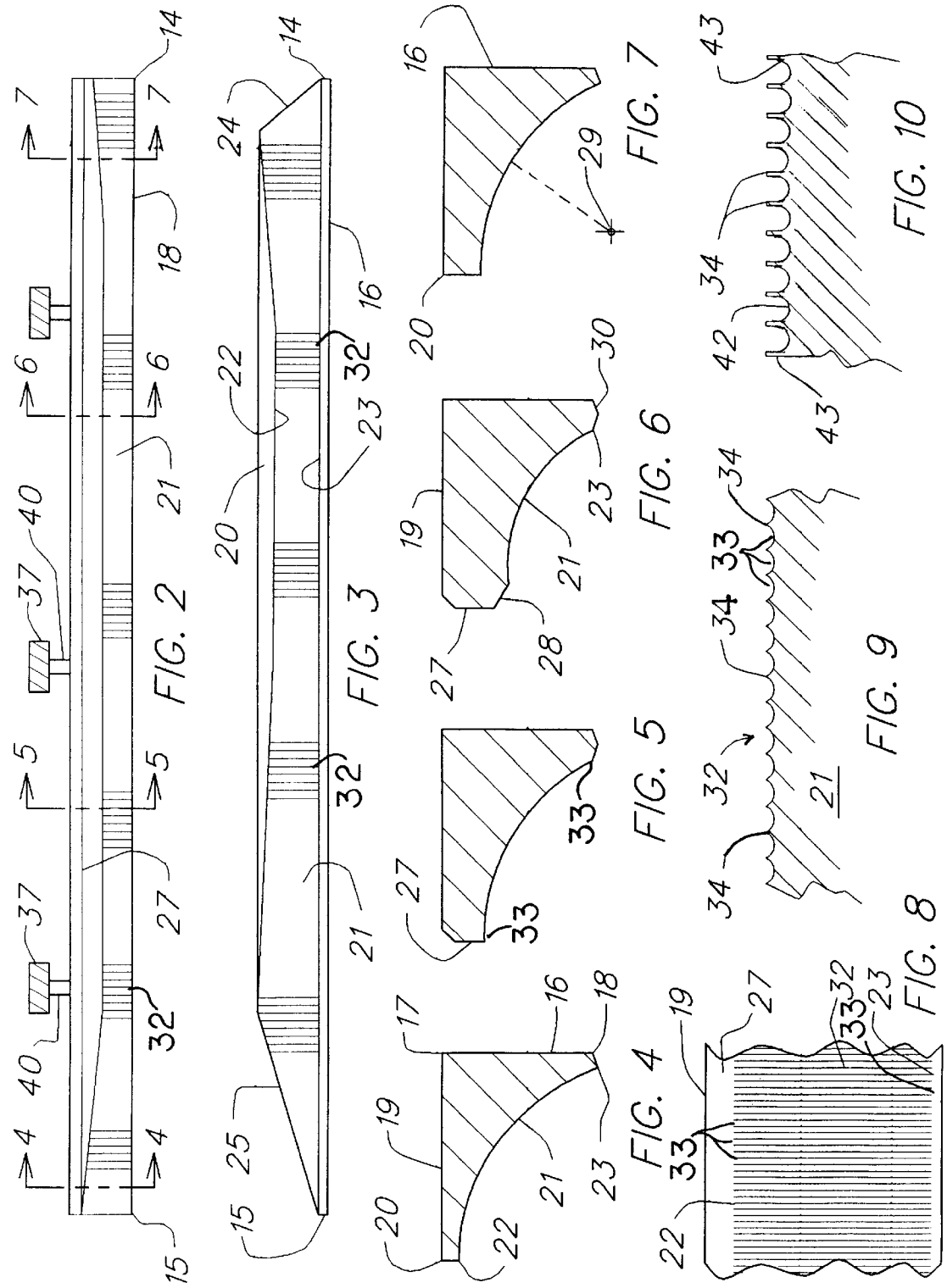

ROUNDER BAR FOR PROCESSING BAKERY DOUGH

BACKGROUND OF THE INVENTION

1. Field of the Invention

This invention relates to the handling of dough for baking, and more particularly concerns apparatus for dispensing successive pieces of dough of uniform shape.

2. Description of the Prior Art

Methods and apparatus for pumping, homogenizing and dividing bakery dough into pieces of predetermined uniform weight for baking into bread loaves, buns, rolls and the like are disclosed in U.S. Pat. Nos. 4,960,601; 4,517,212; 4,449, 908; 4,424,236; 4,332,538; 4,948,611; and 5,046,940. In general, such apparatus includes a hopper which receives dough, auger means for advancing the dough, metering means which control the advance of the dough, nozzles which receive the metered dough, and cutting means which sever the continuously advancing dough into discrete pieces that fall onto an underlying moving belt.

The number of pieces of dough that fall onto the belt in laterally spaced array usually corresponds to the number of nozzles. However, in some instances a positioner device may be utilized to distribute pieces of dough emergent from a single nozzle onto different positions transverse to the direction of belt travel. Therefore, the number of sites at which pieces of dough are initially disposed upon the belt in lateral array may be greater than the number of nozzles. The several laterally spaced pieces of dough, in longitudinal sequence, constitute separate lines of dough pieces.

The pieces of dough, initially having an irregular shape with protruding portions, are subjected to a shaping treatment which rounds the pieces. The rounding is usually produced by elongated stationary bars extending upwardly from sliding contact with the belt surface and oriented on a bias relative to the direction of belt movement. The bars have an arcuately shaped contact surface, and produce a curling effect as the piece of dough is propelled by the belt in rolling contact with the arcuate surface. Such dough shaping apparatus, generally referred to as a "rounder" or "rounder bar" is disclosed, for example, in U.S. Pat. No. 4,306,850 to Cummins. Although such rounder bars are very effective, there is a tendency for the dough to stick to the surface of the rounder bar.

The sticking or adhering effect at the rounder bar sometimes causes fragments to be torn from the dough pieces. Also, if a piece is slowed in its travel upon the rounder bar because of the sticking effect, the next subsequent piece of dough may catch up with and integrate with the slower preceding piece. Efforts to alleviate the sticking effect generally involve the periodic or continuous spraying of release agents such as food-compatible oils. However, such oils adversely affect the aesthetic appearance of the final baked products, and produce accumulations which engender cleaning problems.

It is accordingly an object of the present invention to provide an improved rounder bar for a dough processing apparatus.

It is another object of this invention to provide a rounder bar as in the foregoing object having diminished sticking affinity for dough.

It is a further object of the present invention to provide a rounder bar of the aforesaid nature which is easily serviceable for maintenance and cleaning purposes.

It is a still further object of this invention to provide a rounder bar of the aforesaid nature of durable construction amenable to low cost manufacture.

These objects and other objects and advantages of the invention will be apparent from the following description.

SUMMARY OF THE INVENTION

The above and other beneficial objects and advantages are accomplished in accordance with the present invention by a rounder bar for shaping pieces of bakery dough advancing upon a flat conveyor belt, said rounder bar having an elongated configuration terminating in upstream and downstream ends, and further having:

a) a rear surface bounded by upper and lower edge extremities, b) a top surface bounded by a forward edge and a rear edge coincident with the upper edge of said rear surface, and c) an arcuate dough-contacting surface of convex contour in relation to said rear and top surfaces, said arcuate surface extending between a front boundary adjacent the forward edge of said top surface and a back boundary adjacent the lower edge extremity of said rear surface, said arcuate surface containing non-occluding texture means.

In preferred embodiments, the rounder bar is a monolithic structure fabricated of a machinable, moldable polymer having a low surface energy which resists adhesive attachments.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is a side view of the embodiment of rounder bar of FIG. 1.

FIG. 3 is a bottom view.

FIGS. 4, 5, 6 and 7 are enlarged sectional views taken upon the lines 4—4, 5—5, 6—6 and 7—7, respectively, in FIG. 2.

FIG. 8 is a greatly enlarged fragmentary view of the arcuate surface component of the embodiment of FIG. 1.

FIG. 9 is a profile view of the arcuate surface of FIG. 8.

FIG. 10 is a profile view of an alternative configuration of the arcuate surface of FIG. 8.

DESCRIPTION OF THE PREFERRED EMBODIMENT

Figure 1:
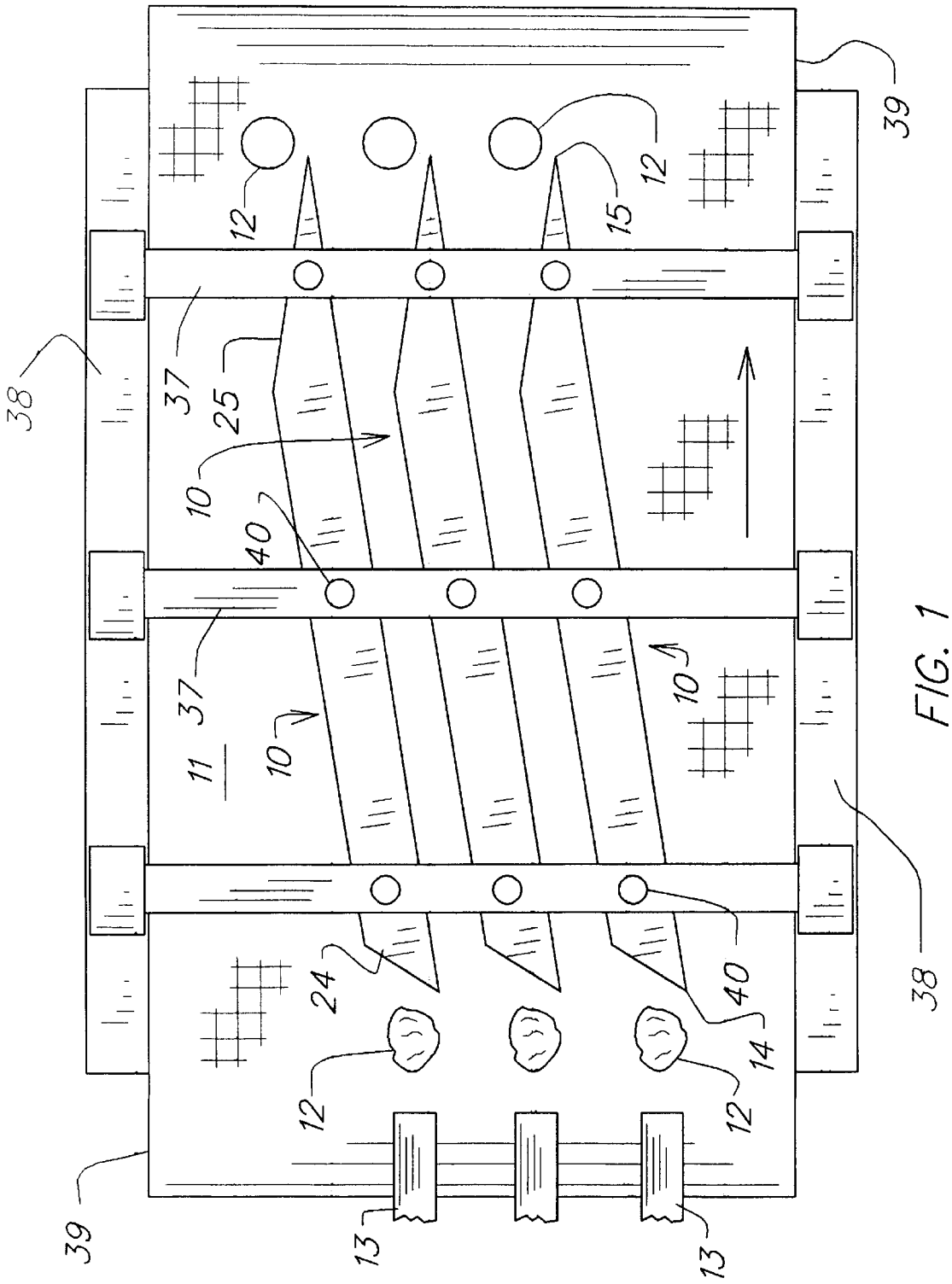
FIG. 1 is a top view of an array of several units of an embodiment of the rounder bar of the present invention shown in operative association with pieces of bakery dough being advanced upon a moving belt.

Referring now to FIGS. 1–10, three identical units of an embodiment of a rounder bar 10 of the present invention are shown operationally positioned upon a horizontally disposed endless conveyor belt 11 moving in the direction shown by the arrowed line, and acting upon several pieces of dough 12, said pieces of dough having been emergent from nozzles 13. Said rounder bars are secured by bolts 40 to overhead transverse beams 37 supported by stationary paired apron strips 38 adjacent the laterally opposed belt edges 39.

Rounder bar 10 is exemplified as a monolithic structure fabricated from a moldable, machinable plastic of low surface energy such as ultra high molecular weight polyethylene. Suitable low surface energy polymers are those wherein the wetting angle of a drop of water resting upon a horizontal flat surface of the polymer is greater than 90 degrees. Low wettability or low adhesive affinity of the polymer surface is desirable in order to minimize unwanted adhesion of dough to the rounder bar. Although proper polymer selection can achieve some minimization of adhesive attachment of the dough, further measures are necessary, as will be described hereinafter.

Rounder bar 10 has an elongated configuration, terminating in upstream and downstream ends 14 and 15, respectively, and further having a flat rear surface 16 bounded in part by upper and lower edge extremities 17 and 18, respectively. A flat top surface 19 is bounded in part by forward edge 20 and a rear edge which is coincident with upper edge 17 of rear surface 16. Although rounder 10 is exemplified as being elongated upon a straight axis, it is conceivable that certain embodiments may be gently curved in a path parallel to said top surface. Upstream end 14 may be provided with a tapered in-feed zone 24. Downstream end 15 may be provided with a tapered exit zone 25.

An arcuate dough-contacting surface 21 having a convex contour in relation to said rear and top surfaces extends between a front boundary 22 adjacent forward edge 20 of said top surface, and a back boundary 23 adjacent lower edge 18 of said rear surface. As shown in FIGS. 4–7, the nature of the curvature of arcuate surface 21 may vary in the course of its extension along the rounder. In the exemplified embodiment, the initial curvature, as shown in FIG. 4, is characterized in having its front boundary 22 close to top surface 19. In the subsequent curvature configurations, shown in FIGS. 5 and 6, said front boundary is successively lowered away from top surface 19. Then, near downstream end 15, the front boundary 22 of the arcuate surface is raised closer to said top surface 19.

The portion of the rounder disposed between top surface 19 and arcuate surface 21 adjacent forward edge 20 may be referred to as a lip portion, terminating in front sidewall 27 disposed in parallel juxtaposition with rear surface 16. By virtue of the aforesaid varying elevation of the front boundary of said arcuate surface, the vertically measured width of said front sidewall will vary. A chamfer surface 28 may be disposed between front sidewall 27 and arcuate surface 21.

The nature of the curvature of arcuate surface 21 is substantially uniform along the length of the rounder, said curvature being approximately circular, convex with respect to said rear and top surfaces, and accordingly concave with respect to the dough pieces 12. The contour of surface 21 is such as to form with said belt a pocket that accommodates the dough pieces. The curvature of surface 21 may be further characterized in that the center 29 of said curvature is located below lower edge extremity 18 and displaced inwardly from forward edge 20 toward rear surface 16.

A footing surface 30 is disposed between the lower edge extremity 18 of rear surface 16 and back boundary 23 of arcuate surface 21. Said footing surface functions to maintain light contacting force upon the belt.

In order to minimize the adhesion of dough pieces upon arcuate surface 21, said surface is provided along its entire length with non-occluding texture means for reducing the effective area that contacts said dough pieces. In the illustrated preferred embodiment, said texture means is in the form of a series of parallel identical grooves 32 extending in planes orthogonal to said rear and top surfaces. It is important to note that each groove terminates in opposed open extremities 33. Accordingly, there is no occlusion or dead end space associated with the grooves capable of trapping particles of dough. As employed herein, the terms "occlusion" and "occluding" are intended to denote a depression which, in horizontal orientation, is capable of confining a liquid such as water. The preferred groove configuration enables the rounder to be periodically washed with water to remove all traces of dough. If, on the contrary, the texture means incorporated pockets, dead ends or other occlusions defined by a bottom surface and surrounding surface, particles of dough entrapped therein would be very difficult to remove during normal cleaning operations.

It has been found that bakery dough, inherently having a very tacky consistency which causes it to adhere to almost all surfaces, has a secondary mechanism of adhension which involves the formation of a vacuum at a contacting surface. Such vacuum resists removal of the dough, causing cohesive failure of the dough substrate, and thereby leaving pieces of dough on the contacted surface. The aforesaid preferred groove structure which has no closed ends has been found of further benefit in minimizing dough adhesion by providing air access to the interface of the dough and rounder bar surface. Such air access overcomes the effects of the vacuum mechanism of adhesion.

The groove structure of the exemplified embodiment is such as to provide intervening ridges or lands 34 that constitute the residual contact area of surface 21. It has been found that effective minimization of dough sticking is achieved when the residual contact area is less than 50% of the total geometrically measured area of surface 21. Adjustment of the total residual contact area may be achieved by minimizing the width of lands 34. It has also been found that the depth of grooves 32 should be between 0.005 and 0.015 inch to achieve effectiveness in reducing adhesion without capturing pieces of dough. In preferred embodiments, there will be between 40 and 100 grooves per inch. It has been found that, in order to avoid entrapment of microscopic pieces of dough, the grooves should preferably have a rounded contour, as shown in FIG. 9, in which case the intervening lands will be in the form of pointed apices of cusp-like contour. Although the width of the cusp-like lands is difficult to measure, it is estimated the degree of reduction of contact area, namely the amount of original area removed from surface 21, is greater than 90%. In the groove embodiment of FIG. 9, the ratio of the width of the grooves, measured between adjacent pointed apices, to the height of the grooves, measured orthogonally between the rounded bottom valleys and the plane of the apices, is preferably between about 1:1 and 5:1. Alternative texture means may be employed which provide similar reduction in effective contact surface without creating occlusive pockets. The texture means may be alternatively characterized as a surface having a roughness value between 63 and 125, wherein said roughness value is the arithmetical average deviation of the heights of surface irregularities with respect to a hypothetical perfect surface, and expressed in millionths of an inch.

In the alternative groove configuration shown in FIG. 10, the bottom or valley 42 of the grooves is curved and the associated opposed sidewalls 43 are straight, thereby producing a U-shaped contour. The intervening lands 34 are flat and disposed in the original, uncut contact surface 21. In order to achieve the non-sticking and non-occluding advantages of the rounder bar of the present invention, it is preferable that the ratio of the width of the groove, measured between its sidewalls, to the height of the groove, measured between valley 42 and land 34, be between 1:1 and 3:1. Also, the width of lands 34, measured between the sidewalls of contiguous grooves, should be less than half the width of the grooves, measured between the opposing sidewalls of each groove.

A metal bracket bar of L-shape may be attached to the top and rear surfaces of rounder 10 for the purpose of enhancing rigidity and facilitating releasible and adjustable securement to conventional support structure generally disposed above belt 11.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

What is claimed is:

1. A rounder bar for shaping pieces of bakery dough advancing upon a flat conveyor belt, said rounder bar having an elongated configuration terminating in upstream and downstream ends, and further having:
    a) a rear surface bounded by upper and lower edge extremities,
    b) a top surface bounded by a forward edge and a rear edge coincident with the upper edge of said rear surface, and
    c) an arcuate dough-contacting surface of convex contour in relation to said rear and top surfaces, said arcuate surface extending between a front boundary adjacent the forward edge of said top surface and a back boundary adjacent the lower edge extremity of said rear surface, said arcuate surface containing a non-occluding texture comprised of a series of grooves oriented in planes orthogonal to said rear and top surfaces and terminating in opposed open extremities, said grooves defined by a valley bottom, opposed sidewalls, and opposed coplanar lands that constitute a contact surface.

2. The rounder bar of claim 1 having a monolithic structure fabricated of a machinable, moldable polymer having a low surface energy which resists adhesive attachments.

3. The rounder bar of claim 1 wherein said rear and top surfaces are flat.

4. The rounder bar of claim 1 wherein said arcuate surface has a curvature which is substantially uniform along the length of said rounder.

5. The rounder bar of claim 4 wherein said curvature is substantially circular, having a center of curvature located below said lower edge extremity and displaced inwardly from said forward edge toward said rear surface.

6. The rounder bar of claim 1 further comprised of a footing surface disposed between said lower edge extremity and the back boundary of said arcuate surface, said footing surface adapted to maintain contacting force upon said belt.

7. A rounder bar for shaping pieces of bakery dough advancing upon a flat conveyor belt, said rounder bar having an elongated configuration terminating in upstream and downstream ends, and further having:
    a) a rear surface bounded by upper and lower edge extremities,
    b) a top surface bounded by a forward edge and a rear edge coincident with the upper edge extremity of said rear surface, and
    c) an arcuate dough-contacting surface of convex contour in relation to said rear and top surfaces, said arcuate surface extending between a front boundary adjacent the forward edge of said top surface and a back boundary adjacent the lower edge extremity of said rear surface, said arcuate surface containing a series of parallel grooves oriented in planes orthogonal to said rear and top surfaces and terminating in opposed open extremities, said grooves defined by a valley bottom, opposed sidewalls, and opposed coplanar lands that constitute a residual contact surface remaining from the original arcuate surface prior to groove formation.

8. The rounder bar of claim 7 wherein the total area of said residual contact surface is less than 50% of the total area of said original arcuate surface.

9. The rounder bar of claim 1 wherein said grooves number between 40 and 100 per inch of said arcuate surface.

10. The rounder bar of claim 7 wherein said lands are in the form of pointed apices of cusp contour.

11. The rounder bar of claim 7 wherein all the grooves of said series are of identical cross-sectional contour.

12. The rounder bar of claim 7 wherein the depth of said grooves, measured between said valley bottom and associated land, is between 0.005 and 0.015 inch.

13. The rounder bar of claim 12 wherein the ratio of the width of said groove, measured between said sidewalls, to the height of the groove is between 1:1 and 3:1.

14. The rounder bar of claim 10 wherein the ratio of the width of said groove, measured between adjacent apices, to the height of the groove, measured orthogonally between said valley bottom and apices, is between 1:1 and 5:1.

15. The rounder bar of claim 2 wherein said texture means is a surface having a surface roughness value between 63 and 125.

* * * * *